United States Patent Office 3,225,184
Patented Dec. 21, 1965

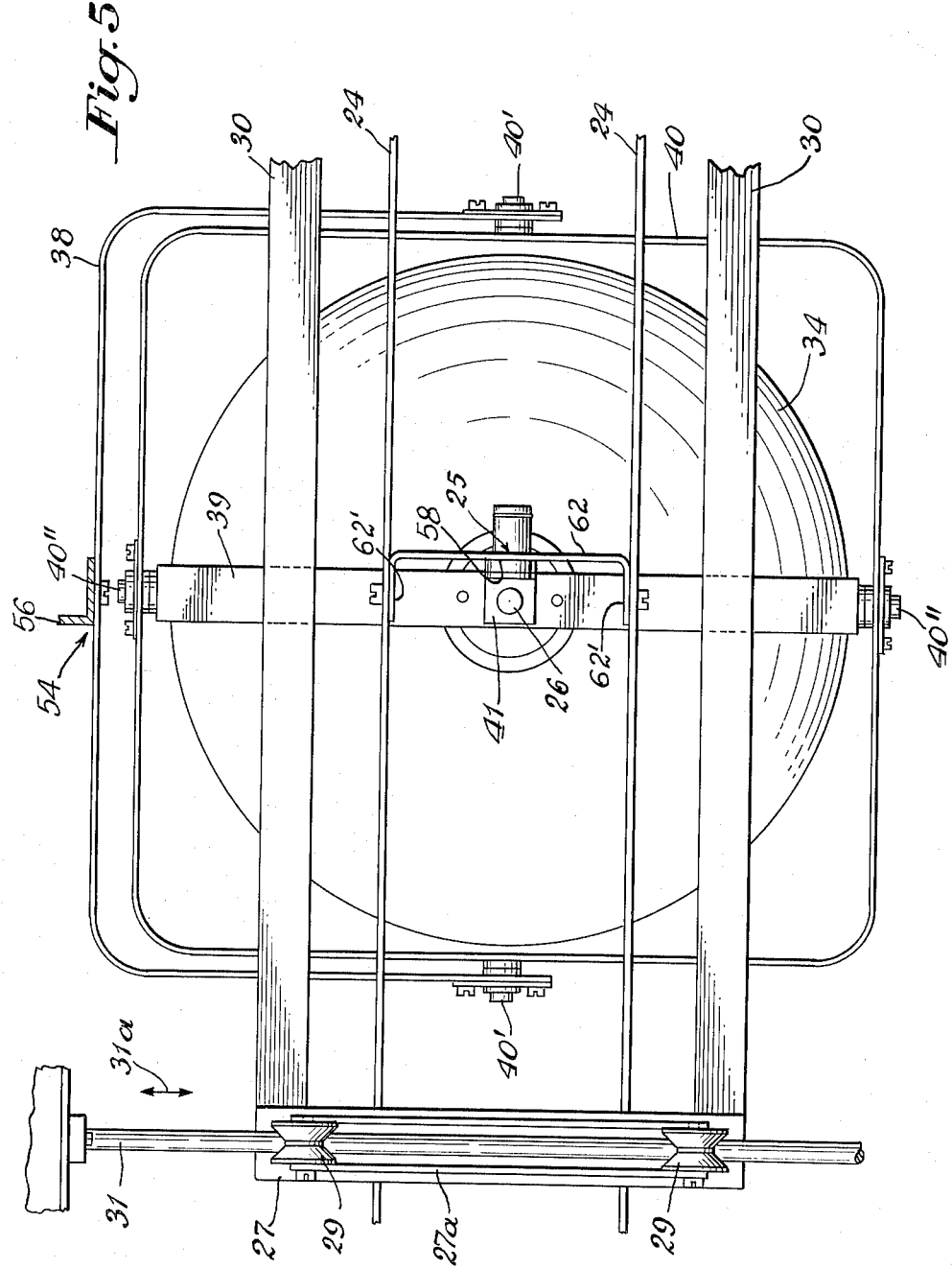

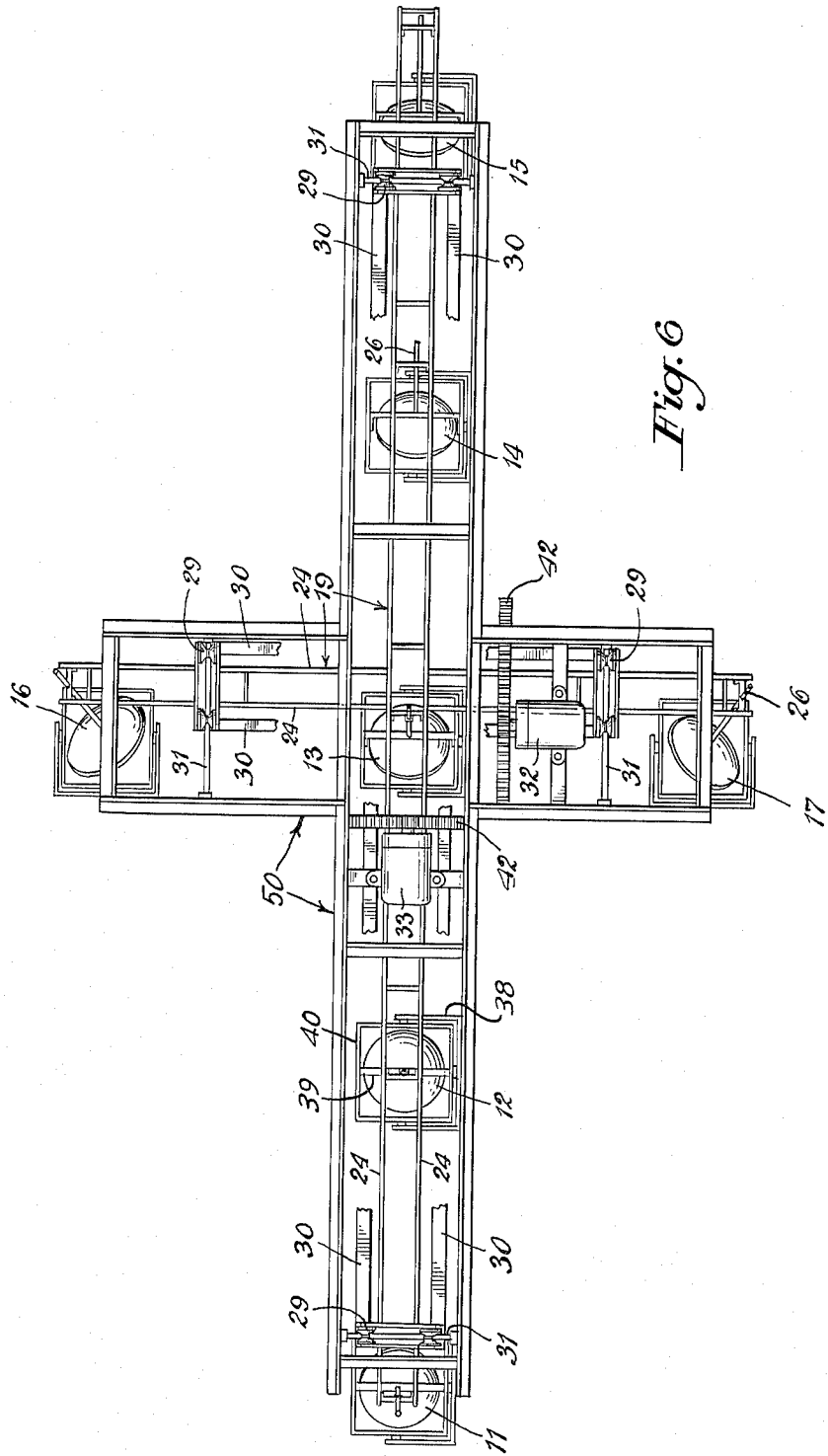

3,225,184
OPERATING ROOM LIGHTING FIXTURE
Heinz-Joachim Reiber, Berlin-Zehlendorf, Germany, assignor, by mesne assignments, to Quarzlampengesellschaft G.m.b.H., Hanau (Main), Germany, a corporation of Germany
Filed Mar. 22, 1962, Ser. No. 181,750
Claims priority, application Germany, Mar. 30, 1961, Z 8,649
1 Claim. (Cl. 240—1.4)

This invention relates to a lighting fixture particularly for operating rooms and which is fixedly mounted in or on the ceiling of the room and is used for illuminating predetermined areas within an extensive area. The lighting fixture is provided with a number of individual searchlights all of which are pivotally adjustable at the same time. The light beams of these search lights produce substantially parallel light rays and meet always at the same limited area to be illuminated.

It is an object of the invention to provide a lighting fixture of the type mentioned, in which each individual searchlight is associated with a common control rod unit which is operative along two coordinates which preferably are arranged perpendicularly to each other, said control unit being connected to rockable searchlight supports which all are caused to move in identical paths.

Still another object of the invention is a lighting fixture which is adapted to be fixedly mounted to the ceiling of a room and comprises a plurality of individual searchlights for illuminating within an extensive area predetermined fields of a limited area, means for pivotally supporting said individual searchlights, means for simultaneously rocking all of said search lights so that their beams of light comprising substantially parallel rays meet at the selected field of limited area, said means for simultaneously rocking all of said searchlights comprising a common control rod unit operative in two coordinates which intersect each other, said control rod unit being connected with said pivotally supporting means in control planes which extend parallel to the surface to be illuminated, whereby said control planes of all searchlights are uniform and all of said pivotally supporting means move in identical paths. Each of said pivotally supporting means is connected to its associated searchlight in such a manner that the searchlight is swingable about the focal point of its optical illuminating system.

It is also an object of the invention to provide the lighting fixture with means for varying the intensity of the light emitted by said individual searchlight, either in such a manner that the light intensity of all of said searchlights is varied about the same degree, or individually at varying degree.

Still another object of the invention is to provide a photographic camera, a motion picture camera, a television camera or an X-ray apparatus and operatively connect the same with said control rod unit in the same manner the searchlights are connected with said control rod unit, so that the optical axis of this additional apparatus passes through the center point of the illuminated field.

With these and other objects in view, the invention will be described hereinafter in more detail with reference to the accompanying drawings, in which:

FIG. 5 is a top view of one of the individual searchlights with a portion of the control rod unit associated therewith;

FIG. 6 is a top view of the lighting fixture according to FIG. 1, and

Figure 1:
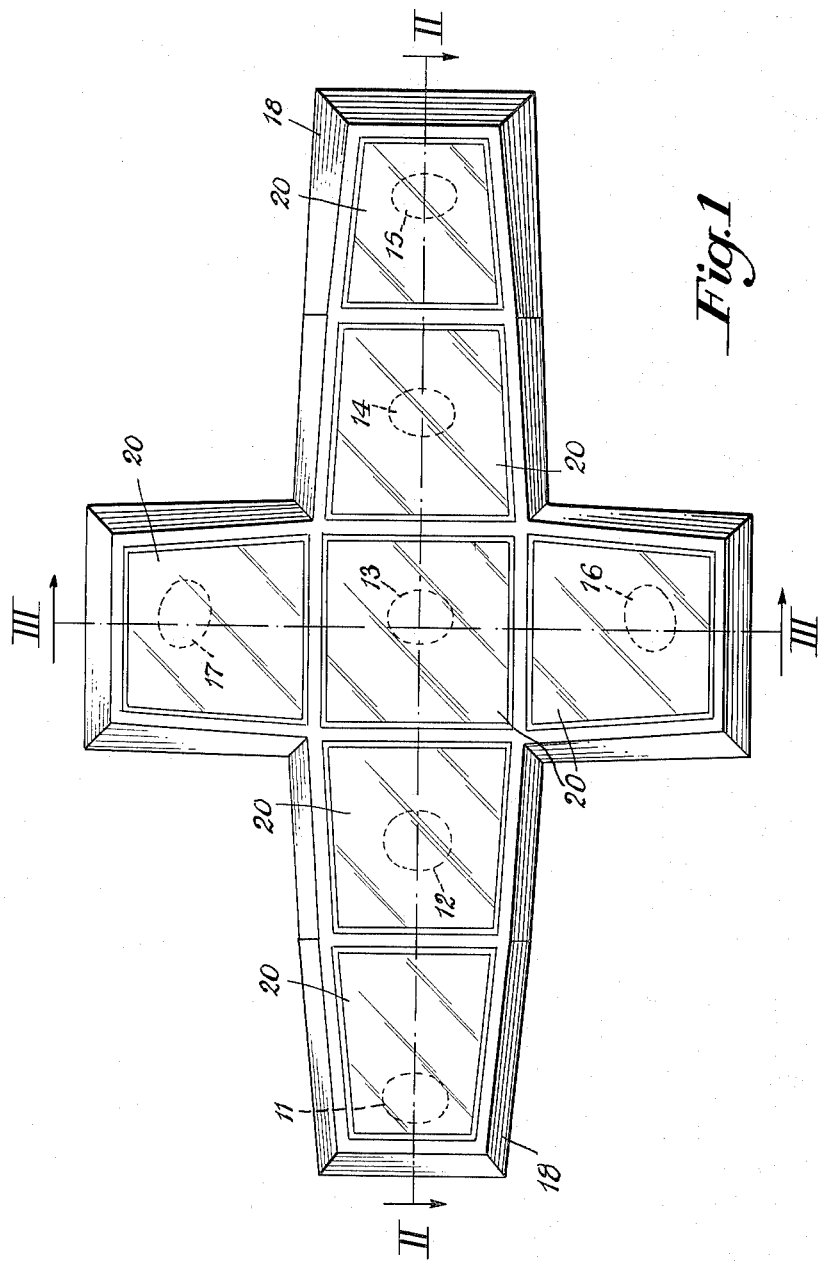
FIG. 1 is a view of the lighting fixture from below toward a ceiling on which the fixture is mounted.

The embodiment of the lighting fixture of the invention illustrated in the drawings is equipped with seven individual searchlights 11, 12, 13, 14, 15, 16 and 17 arranged in the form of a cross as particularly shown in FIG. 1. The housing of the fixture is provided with a corresponding number of light emitting windows arranged closely adjacent each other and which are, so to speak, mounted on the ceiling of the operating room.

The individual searchlights 11 to 17 inclusive are pivotally mounted in a frame 40 (omitted from FIGS. 2 and 3) within a spray water-proof lamp housing 18 and are connected with each other by a control rod unit 19 (see particularly FIG. 6) which is common to all the searchlights. The lower wall of the lamp housing 18 is closed by downwardly swingable clear or translucent plates 20.

The optical axes 11′, 12′, 13′, 14′, 15′, 16′ and 17′ of the individual searchlights 11 to 17 inclusive, intersect in a point 23 which is positioned in the operating plane 22 which lies about 8 inches above the top 21 of the operating table.

Figure 7:
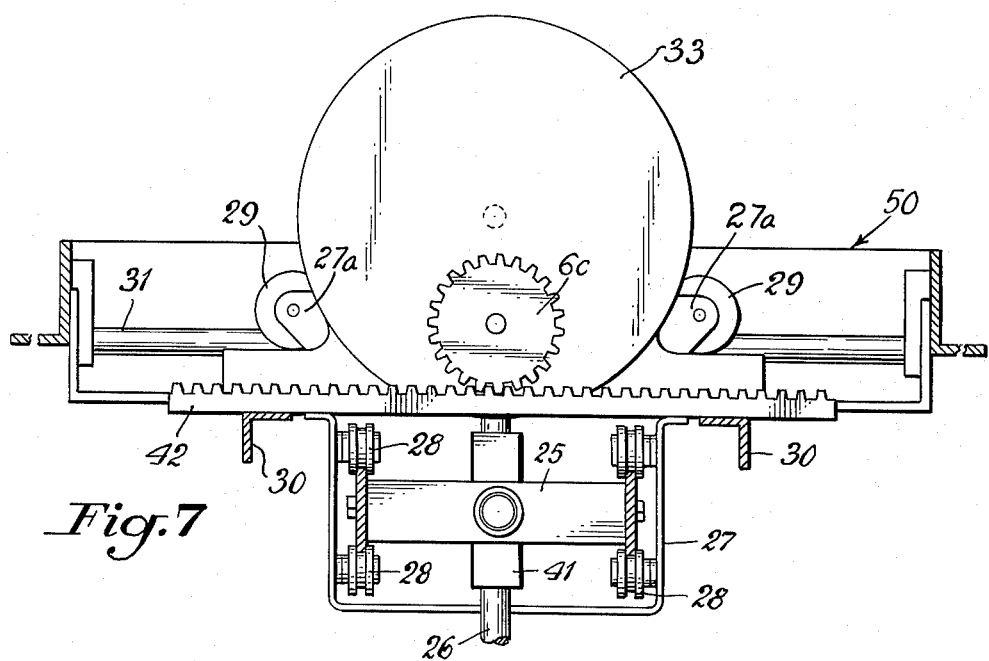
FIG. 7 is an end view of the control rod unit of the lighting fixture of FIG. 1.

The control rod unit 19 comprises two pairs of rails 24 which are rigidly interconnected in the form of a cross, as shown particularly in FIG. 6. Each pair of rails 24 is supported and guided by rollers 28 (FIGS. 4 and 7) which are rotatably secured to a plurality of transverse brackets 27 secured in any suitable manner to one of two pairs of angle iron bars 30 arranged parallel with the rails 24 and fixedly connected to carriages 27a which by means of rollers 29 rotatably mounted thereon are supported by guide rods 31 secured to the frame 50 transversely of the angle iron bars 30 and the rails 24. The double arrow 31a, FIG. 4, indicates the direction of movement of the carriage 27a on the guide rods 31. Obviously, therefore, the rails 24 are movable longitudinally in relation to the corresponding pair of angle iron bars 30, while the rails 24 and the corresponding pair of angle iron bars 30 are movable as a unit transversely of the adjacent members of the frame 50.

Figure 4:
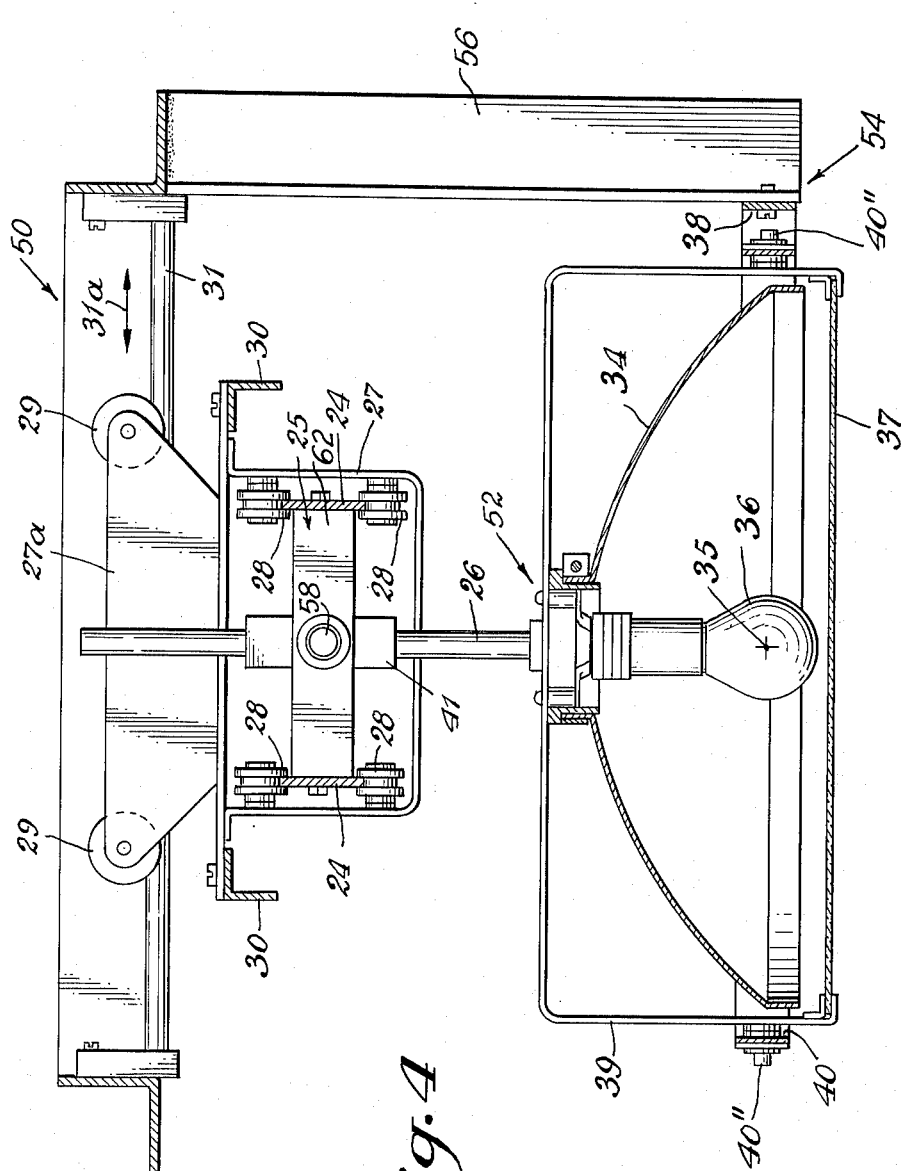
FIG. 4 is a vertical sectional view of one of the individual searchlights of the lighting fixture of the invention.

Each individual searchlight 11 to 17 inclusive consists of a parabolic reflector 34, FIGS. 4 and 5, and a semi-reflecting incandescent lamp 36 arranged in the focal point 35 of the reflector. A stem 26 extends rearwardly and in axial direction from the reflector 34. At the lower opening of the reflector 34 is arranged a heat protective filter 37. The stems 26 are connected with the rod unit 19 in a manner to be described.

The reflector 34 is secured at its top to a U-shaped bail 39, as shown particularly at 52 in FIG. 4. The bail 39 is provided adjacent to its ends with pivot pins 40″ by means of which the bail 39 is pivotally journaled in a frame 40, FIGS. 4 and 5, which in turn is provided with aligned pivot pins 40′ by means of which the frame 40 is pivotally mounted in a second U-shaped bail 38 for rotary movement about an axis perpendicular to the axis of pivot pins 40″. The bail 38 is secured, as at 54, to an angle iron member 56 secured to and depending from the frame 50. Thus, the members 38, 39, 40 together provide a cardanic suspension means for the reflector 34.

Figure 2:
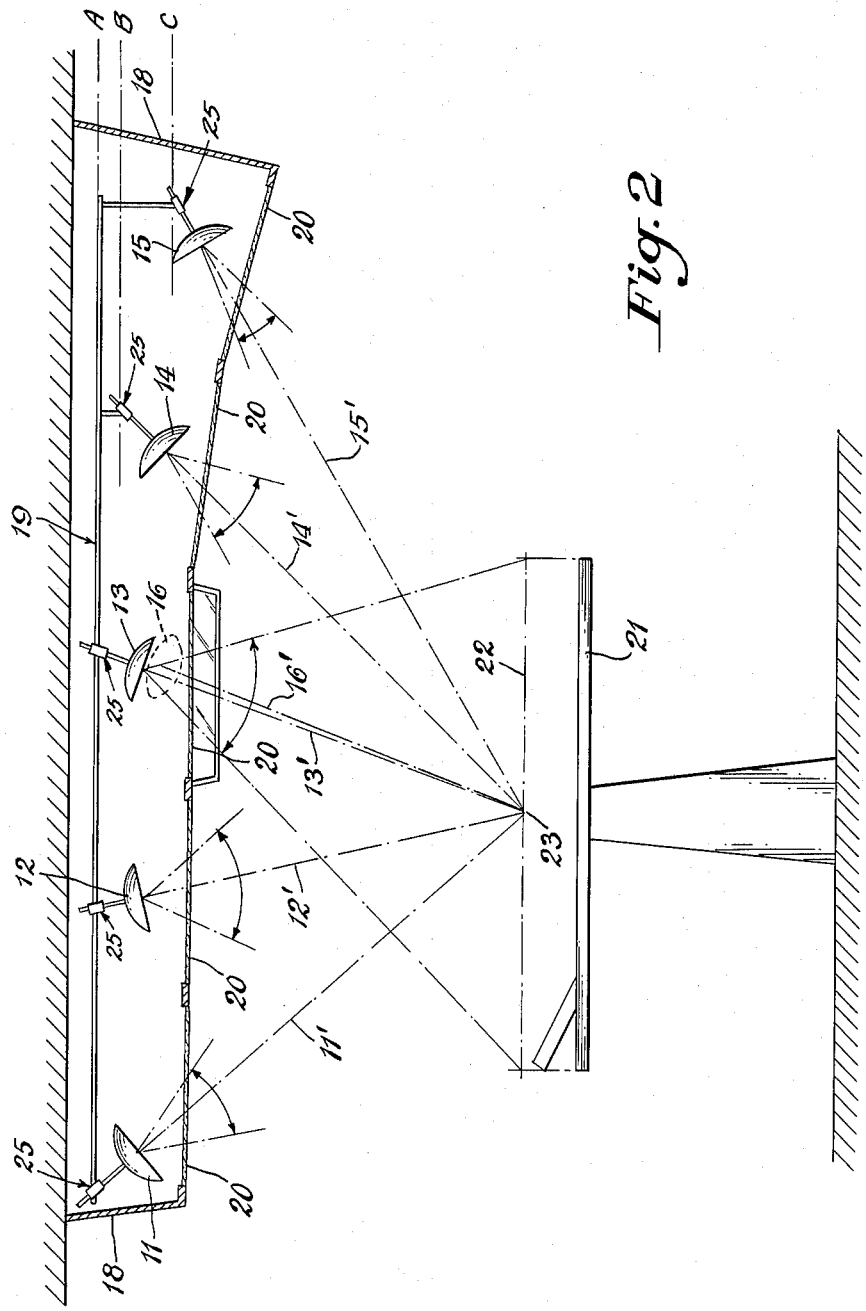
FIG. 2 is a vertical sectional view along the line II—II of FIG. 1.
Figure 3:
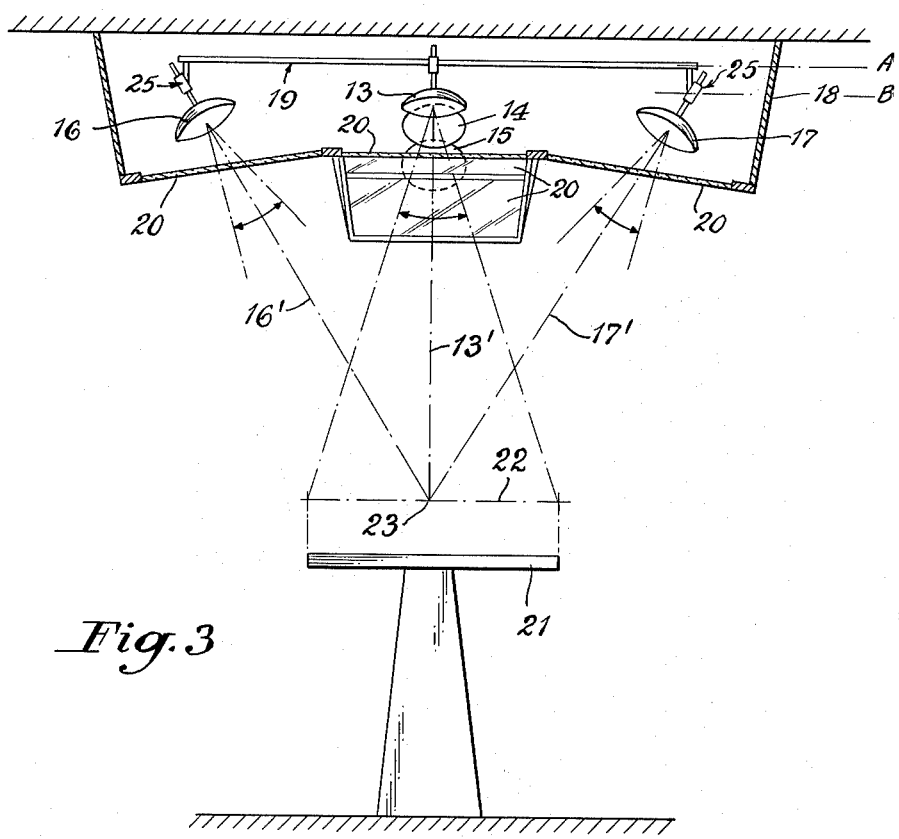
FIG. 3 is a vertical sectional view along the line III—III of FIG. 1.

The stem 26 extends through a bore in a guide block 41 which is pivotally secured, as at 58, to a U-shaped bail 62 which in turn has its legs 62′ pivotally secured to the rails 24 for rotary movement of the bail 62 about an axis perpendicular to the axis of the connection at 58. The cross joint or pivotally supporting means thus formed bears the general indication 25, and each such cross joint is in the embodiment shown movable in one of three parallel planes which in FIGS. 2 and 3 are marked A, B and C.

A gear rack 42 is secured to the angle iron bars 30 transversely thereof for meshing engagement with a gear 60 which is driven by an electric motor 33 fixedly mounted on the frame 50. A second motor 32 is similarily mounted and connected with the angle iron bars 30 in the cross member of frame 50, as shown in FIG. 6. The motors 32, 33 are of the reversible type.

The control rod unit 19 may be moved selectively in the direction of one coordinate by one motor 32 or 33, or may be moved simultaneously in the direction of both coordinates by operating both motors 32 and 33.

A movement of the control rod unit 19 in one direction causes a corresponding movement in the same direction of all cross joints 25. With the latter are moved all individual searchlights 11 to 17 about their pivot axes 40' and 40" and the guide blocks 41 of the cross joints 25 slide along the stems 26.

According to the laws of mechanical movements all individual searchlights 11 to 17 are pivotally adjusted by a movement of the control rod unit in such a manner that the optical axes 11' to 17' of all beams of light retain their common point of intersection 23 in the illuminated field, but this point of intersection, upon demand of the operator, may be displaced, in the present case in the plane 22 which is parallel to the top 21 of the operating table.

The illustrated embodiment of the invention is only one of many examples which may be employed and, therefore, it is possible to design other embodiments all of which are within the scope of the invention.

For instance, in the lighting system employed for shows, in theaters, auditoriums and exhibition halls which, for example, features ice revues, etc., certain lighting problems are encountered which demand that the lighting apparatus has to be arranged at a sufficient distance away from the area to be illuminated and still it must be possible to direct at least a portion of the light beams at a relatively flat angle to said area. Furthermore, when an illuminated area of limited size is to be displaced within a larger area, the brightness of the area of limited size should not change or only very little when it is displaced.

In certain performances in a show it is necessary to produce travelling light spots of uniform brightness which is a problem that can easily be solved by providing a lighting fixture in accordance with the present invention which provides for a remote control of individual searchlights.

What I claim is:

In a fixedly mounted lighting fixture, means defining a frame, a plurality of individual searchlights, means supporting said searchlights on said frame for tilting movement of each searchlight about two intersecting axes, a control rod unit, a plurality of universally movable cross joint means spacedly mounted on said control rod unit, means connecting each of said searchlights with one of said cross joint means, the initial arrangement being such as to focus the light from said searchlights upon one and the same point, means supporting said control rod unit on said frame for independent movement of said control rod unit relative to said frame in two intersecting directions, and separate reversible drive means for effecting said movement of the control rod unit in said intersecting directions, whereby actuation of said separate drive means individually as well as simultaneously causes simultaneous tilting of said searchlights so as to move said focal point in a single plane, each said cross joint means including a guide block, means supporting said guide block for rotary movement about two intersecting axes, and a stem rigidly secured to the corresponding searchlight and slidably extending through a bore in said guide block.

References Cited by the Examiner
UNITED STATES PATENTS

| | | | |
|---|---|---|---|
| 1,146,619 | 7/1915 | Grover | 240—62.1 |
| 1,700,590 | 1/1929 | Lazar | 240—1.4 |
| 1,731,772 | 10/1929 | Greenwalt | 240—3.1 X |
| 1,909,947 | 5/1933 | Greppin | 240—1.4 |
| 1,963,218 | 6/1934 | Wakefield. | |
| 2,173,325 | 9/1939 | Alexander | 240—1.4 |
| 2,758,196 | 8/1956 | Greppin | 240—1.4 X |
| 2,911,519 | 11/1959 | Phillips et al. | 240—1.4 |
| 3,005,087 | 10/1961 | Klein | 240—61.8 X |

NORTON ANSHER, *Primary Examiner.*